(12) United States Patent
Narimatu

(10) Patent No.: US 12,073,129 B2
(45) Date of Patent: Aug. 27, 2024

(54) IMAGE FORMING APPARATUS, METHOD FOR CONTROLLING IMAGE FORMING APPARATUS, AND PROGRAM FOR CONTROLLING IMAGE FORMING APPARATUS WITH COLOR TONE CORRECTION

(71) Applicant: Konica Minolta, Inc., Tokyo (JP)

(72) Inventor: Eiichi Narimatu, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/205,056

(22) Filed: Jun. 2, 2023

(65) Prior Publication Data
US 2023/0401014 A1  Dec. 14, 2023

(30) Foreign Application Priority Data
Jun. 14, 2022  (JP) .................. 2022-095959

(51) Int. Cl.
G06F 3/12  (2006.01)

(52) U.S. Cl.
CPC .......... *G06F 3/1208* (2013.01); *G06F 3/1256* (2013.01)

(58) Field of Classification Search
CPC .... G06F 3/1208; G06F 3/1255; G06F 3/1256; G06K 15/027; G06K 15/129; G06K 15/1868; H04N 1/00045; H04N 1/6033
USPC ................................... 358/1.9, 504
See application file for complete search history.

(56) References Cited

U.S. PATENT DOCUMENTS

| | | | |
|---|---|---|---|
| 9,489,162 B2 * | 11/2016 | Piazza .................. | G06K 15/027 |
| 2014/0146331 A1 * | 5/2014 | Sato ..................... | G06K 15/129 |
| | | | 358/1.9 |
| 2021/0014384 A1 * | 1/2021 | Matsuoka ............. | H04N 1/6055 |

FOREIGN PATENT DOCUMENTS

JP        2017-175318 A      9/2017

* cited by examiner

*Primary Examiner* — Kent Yip
(74) *Attorney, Agent, or Firm* — RANKIN, HILL & CLARK LLP

(57) ABSTRACT

An image forming apparatus includes: a printer that performs printing on paper; and a first hardware processor that is able to execute a color adjustment process of a color to be printed on the paper by the printer on the basis of a result of printing on the paper; a second hardware processor that acquires paper information of the paper to pass through the printer; and a third hardware processor that determines whether or not the color adjustment process by the first hardware processor is possible on the basis of a result of acquisition of the paper information by the second hardware processor.

10 Claims, 17 Drawing Sheets

FIG. 7

| | PROFILE No. | 1 | 2 | 3 | 4 | 5 |
|---|---|---|---|---|---|---|
| BASIC SETTING | PAPER NAME | WHITE PLAIN PAPER | BLACK PLAIN PAPER | WHITE GLOSSY PAPER | YELLOW PLAIN PAPER | WHITE THICK PAPER |
| | PAPER TYPE | PLAIN PAPER | PLAIN PAPER | COATED PAPER | PLAIN PAPER | COATED PAPER |
| | PAPER COLOR | WHITE | BLACK | WHITE | YELLOW | WHITE |
| | | | | | | |
| CHARACTERISTIC VALUE | SMOOTHNESS | AAA_1 | AAA_2 | AAA_3 | AAA_4 | AAA_5 |
| | BASIS WEIGHT | 62g/m$^2$ | 62g/m$^2$ | 125g/m$^2$ | 62g/m$^2$ | 250g/m$^2$ |
| | WATER CONTENT | BBB_1 | BBB_2 | BBB_3 | BBB_4 | BBB_5 |
| | THICKNESS | CCC_1 | CCC_2 | CCC_3 | CCC_4 | CCC_5 |
| | | | | | | |

FIG. 8

| | | WHITE PLAIN PAPER | BLACK PLAIN PAPER | WHITE GLOSSY PAPER | YELLOW PLAIN PAPER | WHITE THICK PAPER |
|---|---|---|---|---|---|---|
| PAPER NAME | | | | | | |
| | PAPER TYPE | PLAIN PAPER | PLAIN PAPER | COATED PAPER | PLAIN PAPER | COATED PAPER |
| | BASIS WEIGHT | 62g/m² | 62g/m² | 125g/m² | 62g/m² | 250g/m² |
| | SMOOTHNESS | AAA_1 | AAA_2 | AAA_3 | AAA_4 | AAA_5 |
| | WATER CONTENT | BBB_1 | BBB_2 | BBB_3 | BBB_4 | BBB_5 |
| | THICKNESS | CCC_1 | CCC_2 | CCC_3 | CCC_4 | CCC_5 |
| | COLOR | WHITE | BLACK | WHITE | YELLOW | WHITE |
| AUTOMATIC MAXIMUM DENSITY ADJUSTMENT (YMCK) | | ○ | △ (ONLY YMC) | ○ | △ (ONLY MCK) | ○ |
| AUTOMATIC MAXIMUM DENSITY ADJUSTMENT (WHITE) | | × | ○ | × | ○ | × |
| OUTPUT-PAPER-DENSITY ADJUSTMENT (FOR WHITE PLAIN PAPER) | | ○ | × | × | × | × |
| OUTPUT-PAPER-DENSITY ADJUSTMENT (FOR BLACK PLAIN PAPER) | | × | ○ | × | × | × |
| OUTPUT-PAPER-DENSITY ADJUSTMENT (FOR WHITE GLOSSY PAPER) | | × | × | ○ | × | × |
| OUTPUT-PAPER-DENSITY ADJUSTMENT (FOR YELLOW PLAIN PAPER) | | × | × | × | ○ | × |
| DENSITY BALANCE ADJUSTMENT (FOR WHITE PLAIN PAPER) | | ○ | × | × | × | × |
| DENSITY BALANCE ADJUSTMENT (FOR BLACK PLAIN PAPER) | | × | ○ | × | × | × |
| DENSITY BALANCE ADJUSTMENT (FOR WHITE GLOSSY PAPER) | | × | × | ○ | × | × |
| DENSITY BALANCE ADJUSTMENT (FOR YELLOW PLAIN PAPER) | | × | × | × | ○ | × |

○: EXECUTABLE
△: PARTLY EXECUTABLE
×: INEXECUTABLE

FIG. 11

ADJUSTMENT OF DRUM CHARACTERISTICS
〈AUTOMATIC MAXIMUM DENSITY INITIAL ADJUSTMENT〉

SERVICE — 302

MAXIMUM DENSITY IS ADJUSTED.
USER'S MAXIMUM DENSITY ADJUSTMENT VALUE IS RESET AFTER ADJUSTMENT.

[PAPER SETTING DURING REGISTRATION OF TARGET DENSITY]
REGISTERED NAME : Mondi Color Copy Coated Silk 170
PAPER TYPE : COATED PAPER ML
BASIS WEIGHT : 136–176g/m²

[DENSITY MEASUREMENT RESULT (REFERENCE VALUE)]
               Y    M    C    K
TARGET DENSITY   0.99  1.50  1.76  1.95
DENSITY AFTER ADJUSTMENT ——

| | CURRENT VALUE |
|---|---|
| Y | +0 |
| M | +0 |
| C | +0 |
| K | +0 |
| W | +0 |

PRINT MODE — 304

INITIALIZE TARGET DENSITY VALUE

PREVIOUS SCREEN

| | | WHITE PLAIN PAPER | BLACK PLAIN PAPER | WHITE GLOSSY PAPER | YELLOW PLAIN PAPER | WHITE THICK PAPER | CORRELATION |
|---|---|---|---|---|---|---|---|
| | PAPER NAME | PLAIN PAPER | PLAIN PAPER | COATED PAPER | PLAIN PAPER | COATED PAPER | |
| | PAPER TYPE BASIS WEIGHT | 62g/m² | 62g/m² | 125g/m² | 62g/m² | 250g/m² | |
| | SMOOTHNESS | AAA_1 | AAA_2 | AAA_3 | AAA_4 | AAA_5 | |
| | WATER CONTENT | BBB_1 | BBB_2 | BBB_3 | BBB_4 | BBB_5 | |
| | THICKNESS | CCC_1 | CCC_2 | CCC_3 | CCC_4 | CCC_5 | |
| | COLOR | WHITE | BLACK | WHITE | YELLOW | WHITE | |
| ○: EXECUTABLE △: PARTLY EXECUTABLE ×: INEXECUTABLE | AUTOMATIC MAXIMUM DENSITY ADJUSTMENT (YMCK) | ○ | △ (ONLY YMC) | ○ | △ (ONLY MCK) | ○ | AUTOMATIC MAXIMUM DENSITY ADJUSTMENT (WHITE) |
| | AUTOMATIC MAXIMUM DENSITY ADJUSTMENT (WHITE) | × | ○ | × | ○ | × | AUTOMATIC MAXIMUM DENSITY ADJUSTMENT (YMCK) |
| | OUTPUT-PAPER-DENSITY ADJUSTMENT (FOR WHITE PLAIN PAPER) | ○ | × | × | × | × | NONE |
| | OUTPUT-PAPER-DENSITY ADJUSTMENT (FOR BLACK PLAIN PAPER) | × | ○ | × | × | × | NONE |
| | OUTPUT-PAPER-DENSITY ADJUSTMENT (FOR WHITE GLOSSY PAPER) | × | × | ○ | × | × | NONE |
| | OUTPUT-PAPER-DENSITY ADJUSTMENT (FOR YELLOW PLAIN PAPER) | × | × | × | ○ | × | NONE |
| | DENSITY BALANCE ADJUSTMENT (FOR WHITE PLAIN PAPER) | ○ | × | × | × | × | NONE |
| | DENSITY BALANCE ADJUSTMENT (FOR BLACK PLAIN PAPER) | × | ○ | × | × | × | NONE |
| | DENSITY BALANCE ADJUSTMENT (FOR WHITE GLOSSY PAPER) | × | × | ○ | × | × | NONE |
| | DENSITY BALANCE ADJUSTMENT (FOR YELLOW PLAIN PAPER) | × | × | × | ○ | × | NONE |

FIG. 15

| COLOR ADJUSTMENT TYPE | PREVIOUS EXECUTION DATE |
|---|---|
| AUTOMATIC MAXIMUM DENSITY ADJUSTMENT (YMCK) | T1 |
| AUTOMATIC MAXIMUM DENSITY ADJUSTMENT (WHITE) | T2 |
| OUTPUT-PAPER-DENSITY ADJUSTMENT (FOR WHITE PLAIN PAPER) | T3 |
| OUTPUT-PAPER-DENSITY ADJUSTMENT (FOR BLACK PLAIN PAPER) | T4 |
| OUTPUT-PAPER-DENSITY ADJUSTMENT (FOR WHITE GLOSSY PAPER) | T5 |
| OUTPUT-PAPER-DENSITY ADJUSTMENT (FOR YELLOW PLAIN PAPER) | T6 |
| DENSITY BALANCE ADJUSTMENT (FOR WHITE PLAIN PAPER) | T7 |
| DENSITY BALANCE ADJUSTMENT (FOR BLACK PLAIN PAPER) | T8 |
| DENSITY BALANCE ADJUSTMENT (FOR WHITE GLOSSY PAPER) | T9 |
| DENSITY BALANCE ADJUSTMENT (FOR YELLOW PLAIN PAPER) | T10 |

IMAGE FORMING APPARATUS, METHOD FOR CONTROLLING IMAGE FORMING APPARATUS, AND PROGRAM FOR CONTROLLING IMAGE FORMING APPARATUS WITH COLOR TONE CORRECTION

The entire disclosure of Japanese patent Application No. 2022-095959, filed on Jun. 14, 2022, is incorporated herein by reference in its entirety.

BACKGROUND

Technological Field

The present disclosure relates to an image forming apparatus that executes a color adjustment process.

Description of the Related Art

In an image forming apparatus such as an electrophotographic printer, color correction (calibration) for maintaining print quality constant is important, and as a method thereof, a method for correcting gradation of each basic color of C (cyan), M (magenta), Y (yellow), and K (black) using a one-dimensional curve (one-dimensional look-up table (LUT)) of each basic color is known.

In this respect, various color corrections have been proposed, and there is an automatic maximum density adjustment function of printing a patch having the maximum density on specific paper, measuring the density of the patch by a colorimeter at a subsequent stage, and adjusting an optimum amount of deposited toner.

In addition, an image forming apparatus including a white output also has the automatic maximum density adjustment function. In this case, specific paper different from paper for CMYK is required. Specifically, CMYK adjustment is performed using white paper, and white output is adjusted using black paper.

In this case, when white adjustment is performed on the white paper, the adjustment fails and readjustment is required. In particular, in a case where roll paper is used as paper to be fed, replacement of paper is troublesome, and thus, it may take time for readjustment.

CITATION LIST

Patent Literature

Patent Literature 1: JP 2017-175318 A

SUMMARY

An object of the present disclosure is to provide an image forming apparatus capable of determining possibility of color adjustment by a simple method.

To achieve the abovementioned object, according to an aspect of the present invention, an image forming apparatus reflecting one aspect of the present invention comprises: a printer that performs printing on paper; and a first hardware processor that is able to execute a color adjustment process of a color to be printed on the paper by the printer on the basis of a result of printing on the paper; a second hardware processor that acquires paper information of the paper to pass through the printer; and a third hardware processor that determines whether or not the color adjustment process by the first hardware processor is possible on the basis of a result of acquisition of the paper information by the second hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram for describing paper profile information according to the embodiment;

FIG. 8 is a diagram for describing a color-adjustment paper information determination database according to the embodiment;

FIG. 11 is a diagram for describing a screen that indicates automatic maximum density adjustment according to the embodiment;

FIG. 14 is a diagram for describing a color-adjustment paper information determination database according to a modification of the embodiment;

FIG. 15 is a diagram for describing an execution history database according to the modification of the embodiment;

DETAILED DESCRIPTION OF EMBODIMENTS

Figure 1:
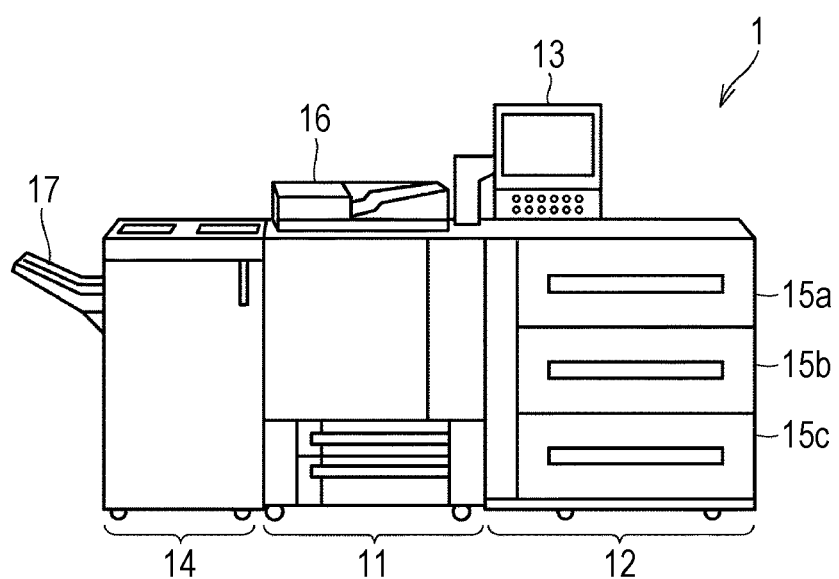
FIG. 1 is a diagram schematically illustrating an external appearance of an image forming apparatus according to an embodiment.

Hereinafter, one or more embodiments of the present invention will be described with reference to the drawings. However, the scope of the invention is not limited to the disclosed embodiments. In the following description, the same parts and components are denoted by the same reference numerals. They also have the same names and the same functions. Hence, they are not repeatedly described in detail. Note that the embodiments and modifications described below may be selectively combined as appropriate.

In the following embodiment, examples of the image forming apparatus include an MFP and a printer.

[Configuration of Image Forming Apparatus 1]

FIG. 1 is a diagram schematically illustrating an external appearance of an image forming apparatus 1 according to the embodiment. Referring to FIG. 1, the image forming apparatus 1 includes an image forming unit 11, a paper feeder 12, an operation panel 13, and a paper ejector 14.

The image forming unit 11 forms an image on paper P in accordance with a print job. The image forming unit 11 includes a photosensitive drum and an exposure device for forming toner images of yellow (Y), magenta (M), cyan (C), black (K), and white (W). The image forming unit 11 superimposes and transfers the toner images of the respective colors on a transfer belt, and transfers the superimposed toner images to the paper P conveyed from the paper feeder 12. The paper P on which the toner image has been transferred is conveyed to the paper ejector 14 and ejected to a paper ejection tray 17.

In addition to the above configuration, the image forming apparatus 1 may further include a post-processor for performing post-processing such as stapling, punching, folding, and cutting on the paper P on which the toner image has been transferred.

The paper feeder 12 conveys papers stored in a paper feed tray 15, which is an example of a placement unit, one by one to the image forming unit 11. The placement unit which has placed thereon the paper P to be conveyed to the image forming unit 11 is not limited to the paper feed tray 15, and includes a manual feed tray 16. The image forming apparatus 1 according to the present embodiment includes a plurality of paper feed trays 15. Specifically, the image forming apparatus 1 includes paper feed trays 15a to 15c and the manual feed tray 16. Hereinafter, the paper feed trays 15a to 15c and the manual feed tray 16 are also collectively referred to as a "tray".

The operation panel 13 is a touch panel type display that receives an input operation by a user. Various setting screens and notifications to the user are displayed on the operation panel 13. The user sets a print job and adjusts the direction of an additional printing image to be formed using the operation panel 13.

For example, the paper P placed on any one of the paper feed trays 15a to 15c and the manual feed tray 16 is conveyed to the image forming unit 11 by the paper feeder 12, is subjected to image processing by the image forming unit 11 by which an image is formed thereon, then is conveyed to the paper ejector 14, and is ejected to the paper ejection tray 17.

[Electrical Configuration of Image Forming Apparatus 1]

Figure 2:
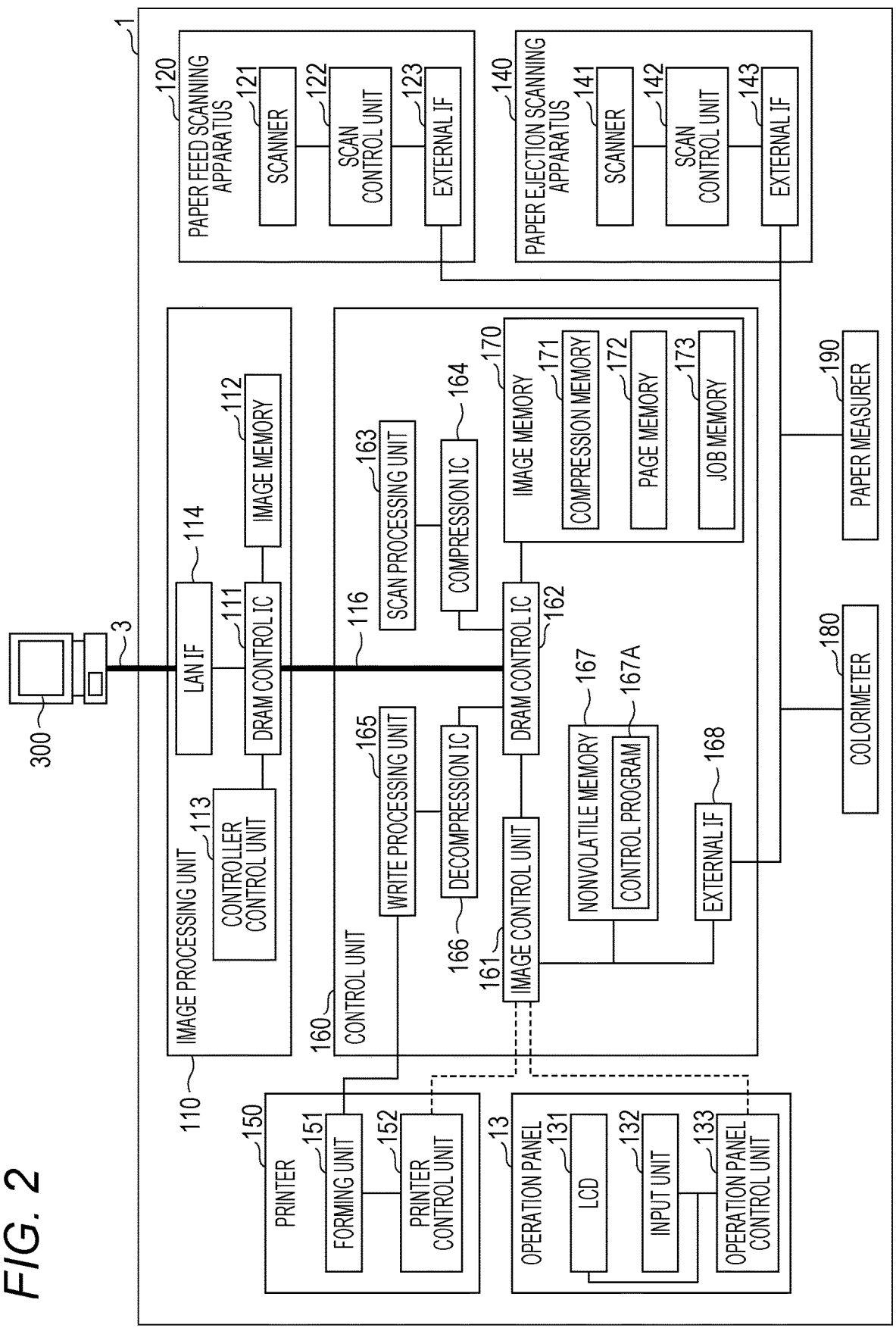
FIG. 2 is a block diagram illustrating an electrical configuration of the image forming apparatus according to the embodiment.

FIG. 2 is a block diagram illustrating an electrical configuration of the image forming apparatus 1 according to the embodiment. Referring to FIG. 2, the image forming apparatus 1 includes, as main components, an image processing unit 110, a paper feed scanning apparatus 120, the operation panel 13, a paper ejection scanner 140, a printer 150, a control unit 160, a colorimeter 180, and a paper measurer 190. The image forming apparatus 1 is communicatively connected to an external device 300 on a network 3.

The image processing unit 110 manages and controls data input to the image forming apparatus 1 from the external device 300 connected to the network 3. The image processing unit 110 receives print job data (hereinafter also referred to as job data) output from the external device 300, and transmits image data and print setting data which are generated by loading the received data to the control unit 160. Note that the output source of the job data is not limited to the external device 300, and may be, for example, the operation panel 13.

The image processing unit 110 includes a dynamic random access memory (DRAM) control IC 111, an image memory 112, a controller control unit 113, and a local area network interface (LANIF) 114.

The DRAM control IC 111 controls transfer of the job data received by the LANIF 114 to the controller control unit 113 and writing and reading of the job data to and from the image memory 112. In addition, the DRAM control IC 111 is connected to a DRAM control IC 162 of the control unit 160 via a bus 116, reads target job data from the image memory 112 according to an instruction from the controller control unit 113, and outputs the target job data to the DRAM control IC 162.

The image memory 112 includes a volatile memory such as a DRAM, and temporarily stores job data.

The controller control unit 113 integrally controls operation of each component of the image processing unit 110, loads print data included in the job data input from the external device 300 via the LANIF 114, and generates image data in bitmap format.

The LANIF 114 is a communication interface, such as a network interface card (NIC) or a modem, for connection to the network 3 such as a LAN, and receives job data and the like from the external device 300. The received job data and the like are output to the DRAM control IC 111.

The paper feed scanning apparatus 120 includes a scanner 121, a scan control unit 122, and an external IF 123, and scans the paper P conveyed from the paper feed tray 15 or the manual feed tray 16 to the image forming unit 11 to acquire a scan image as an image formed on the paper P.

The scanner 121 includes a charge coupled device (CCD), scans one side or both sides of the paper P conveyed from the paper feed tray 15 or the manual feed tray 16 to the image forming unit 11, and outputs acquired data to the scan control unit 122. The scan control unit 122 controls the scanner 121 in accordance with a command from the image control unit 161 input via the external IF 123, acquires data obtained by scanning the paper P conveyed to the image forming unit 11, and outputs the acquired data to the image control unit 161 via the external IF 123. The external IF 123 is a device for communicating with the control unit 160.

The scanner 121 may read the paper P sent from the paper feeder 12, or may read the paper P while the paper P is accommodated in each of the paper feed trays 15a to 15c. That is, the scanner 121 may be provided in the tray from which the paper is fed, or may be provided on any conveyance path from the tray from which the paper is fed to the paper ejection tray 17.

The operation panel 13 includes a liquid crystal display (LCD) 131, an input unit 132, and an operation panel control unit 133. The LCD 131 is an example of a display, and displays various screens for inputting various setting conditions, various processing results, and the like. The input unit 132 receives an input of a user operation, and includes, for example, a touch panel provided to cover the LCD 131, various buttons, a numeric keypad, an operation key group, and the like. The operation panel control unit 133 controls the LCD 131 so that various screens for inputting various setting conditions, various processing results, and the like are displayed in accordance with a display signal input from the image control unit 161. The operation panel control unit 133 also outputs an operation signal input from the input unit 132 to the image control unit 161.

The paper ejection scanner 140 includes a scanner 141, a scan control unit 142, and an external IF 143, and reads an image on the paper P on which the image has been formed by the image forming unit 11 and which is ejected to the paper ejection tray 17.

The scanner 141 includes a CCD, scans one side or both sides of the paper P ejected to the paper ejection tray 17, and outputs acquired data to the scan control unit 142. The scan control unit 142 controls the scanner 141 in accordance with a command from the image control unit 161 input via the external IF 143, acquires data obtained by scanning the paper P on which the image has been formed by the image forming unit 11, and outputs the acquired data to the image control unit 161 via the external IF 143. The external IF 143 is a device for communicating with the control unit 160.

The printer 150 performs electrophotographic image forming processing, and includes a forming unit 151, a printer control unit 152, and the like. The printer control unit 152 includes a central processing unit (CPU), a storage unit, and the like, entirely controls the printer 150 in response to a command from the image control unit 161, and allows the forming unit 151 to form an image on the basis of print image data input from a write processing unit 165.

The forming unit 151 includes a photosensitive drum, a charger that charges the photosensitive drum, an exposure unit that exposes and scans the surface of the photosensitive drum based on image data, a developing unit that deposits toner on the photosensitive drum, a transfer unit that transfers a toner image formed on the photosensitive drum to paper, and a fixing unit that fixes the toner image formed on the paper.

The forming unit 151 is not limited to employ the electrophotographic method, and may employ other printing methods such as an inkjet method and a sublimation method. The forming unit 151 is provided in the image forming unit 11.

The control unit 160 controls the entire image forming apparatus 1 on the basis of job data. In addition, the control unit 160 rewrites the job data on the basis of various settings input via the operation panel 13.

The control unit 160 includes the image control unit 161, the DRAM control IC 162, a scan processing unit 163, a compression IC 164, a write processing unit 165, a decompression IC 166, a nonvolatile memory 167, an external IF 168, and an image memory 170.

The image control unit 161 includes a CPU and the like, reads a control program 167A stored in the nonvolatile memory 167, loads the control program into a random access memory (RAM) (not illustrated), executes each processing, and centrally controls each unit of the image forming apparatus 1. The image control unit 161 receives the data transmitted from the image processing unit 110 and manages the received data.

Furthermore, the image control unit 161 acquires information regarding various settings set from the input unit 132. For example, the image control unit 161 can receive an instruction to execute an automatic maximum density adjustment function, an output-paper-density adjustment function, a density balance adjustment function, and the like from the input unit 132 and execute various kinds of color adjustment processes.

The nonvolatile memory 167 stores processed data and the like in addition to the control program 167A and various kinds of data related to the execution and management of the print job.

In accordance with an instruction from the image control unit 161, the DRAM control IC 162 controls the compression processing of compressing the image data by the compression IC 164 and decompression processing of decompressing the compressed image data by the decompression IC 166, and performs input/output control of the image data to and from the image memory 170. In addition, the DRAM control IC 162 performs input/output control of job data transmitted from the external device 300 to and from the image memory 170 according to an instruction from the image control unit 161.

When an instruction to store data read by the scanner 121 or the scanner 141 is input from the image control unit 161, the DRAM control IC 162 allows the compression IC 164 to execute the compression processing on the image data output from the scanner 121 or the scanner 141 via the external IF 168, and stores the compressed image data in a compression memory 171 of the image memory 170.

In addition, when image data is input from the DRAM control IC 111 of the image processing unit 110, the DRAM control IC 162 allows the compression IC 164 to execute the compression processing on the image data, and stores the compressed image data into the compression memory 171 of the image memory 170.

In addition, when an instruction to print and output the compressed image data stored in the compression memory 171 is input from the nonvolatile memory 167, the DRAM control IC 162 reads the compressed image data from the compression memory 171, performs decompression processing by the decompression IC 166, and stores the decompressed image data in a page memory 172. Further, when an instruction to print and output the image data stored in the page memory 172 is input from the image control unit 161, the DRAM control IC 162 reads the image data from the page memory 172 and outputs the image data to the write processing unit 165.

In addition, the DRAM control IC 162 controls a job memory 173 so that the job memory 173 stores the job data transmitted from the external device 300 in accordance with an instruction from the image control unit 161. The DRAM control IC 162 reads designated job data from the job memory 173 in accordance with an instruction from the image control unit 161, and outputs the job data to the image control unit 161. The DRAM control IC 162 stores the job data edited by the image control unit 161 in the job memory 173.

The image memory 170 includes a DRAM, and has the compression memory 171, the page memory 172, and the job memory 173. The compression memory 171 is a memory for storing compressed image data. The page memory 172 is a memory for temporarily storing image data for print output or temporarily storing image data received from the image processing unit 110 before compression. The job memory 173 is a memory for storing one or a plurality of pieces of job data.

The scan processing unit 163 performs various types of processing such as analog processing, A/D conversion processing, and shading processing on analog image data input via the external IF 168 and acquired by the scanner 121 or 141 to generate digital image data. The generated image data is output to the compression IC 164.

The compression IC 164 performs compression processing on the input digital image data, and outputs the digital image data to the DRAM control IC 162.

The write processing unit 165 generates print image data for image formation on the basis of the image data input from the DRAM control IC 162, and outputs the print image data to the forming unit 151.

The decompression IC 166 performs decompression processing on the compressed image data.

The colorimeter 180 is provided in the paper ejector 14 and measures a density patch for color adjustment.

The paper measurer 190 is provided in the paper feeder 12 and measures characteristic values of various kinds of papers P accommodated in the paper feeder 12.

Figure 3:
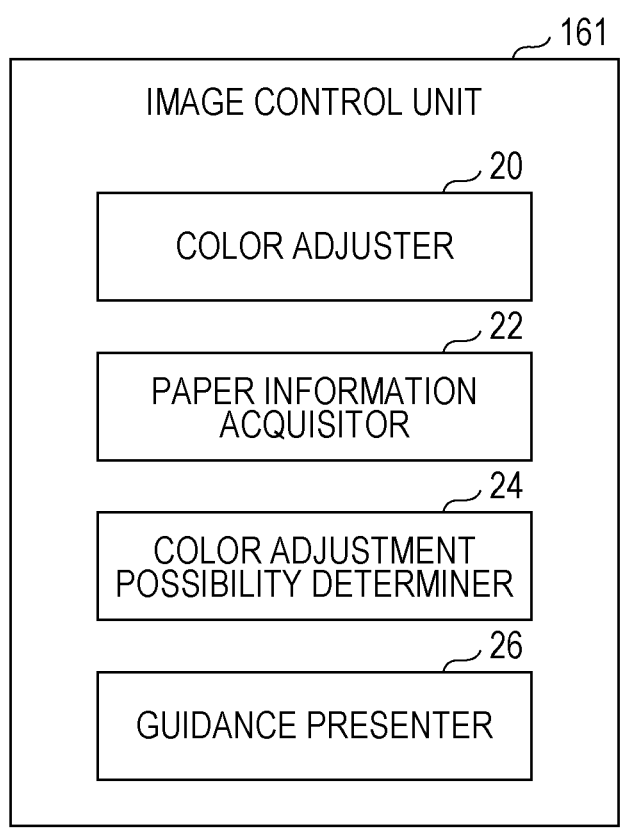
FIG. 3 is a diagram illustrating functional blocks of an image control unit according to the embodiment.

FIG. 3 is a diagram illustrating functional blocks of the image control unit 161 according to the embodiment.

Referring to FIG. 3, the image control unit 161 includes a color adjuster 20, a paper information acquisitor 22, a color adjustment possibility determiner 24, and a guidance presenter 26.

The color adjuster 20 executes a color adjustment process for adjusting a color to be printed on the paper P by the printer 150 on the basis of a result of printing on the paper P.

The paper information acquisitor 22 acquires paper information of the paper P passing through the printer 150.

The color adjustment possibility determiner 24 determines whether or not the color adjustment process by the color adjuster 20 is possible on the basis of the result of acquisition of the paper information by the paper information acquisitor 22.

The guidance presenter 26 prompts the color adjuster 20 to execute the color adjustment process on the basis of execution history information of the color adjustment process by the color adjuster 20 stored in a memory, for example, the nonvolatile memory 167.

Figure 4B:
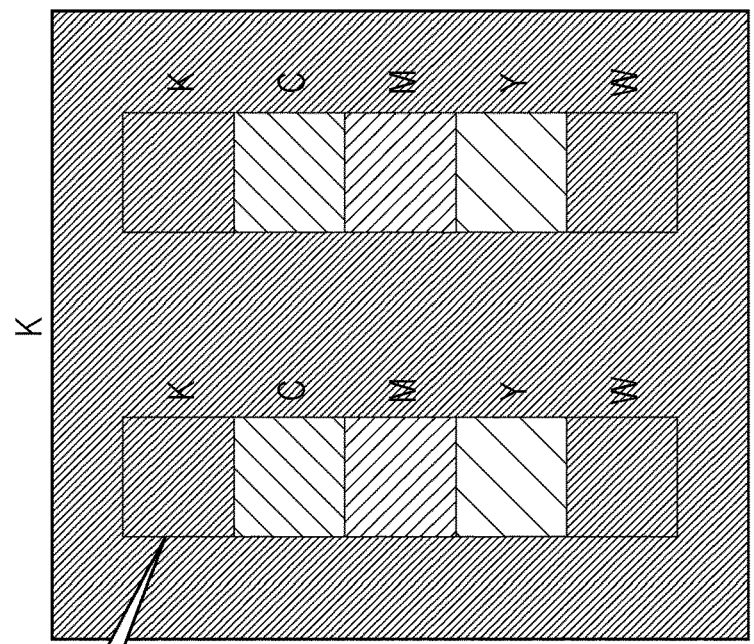
FIGS. 4A and 4B are diagrams for describing an automatic maximum density adjustment process in a color adjustment process according to the embodiment.
Figure 4A:
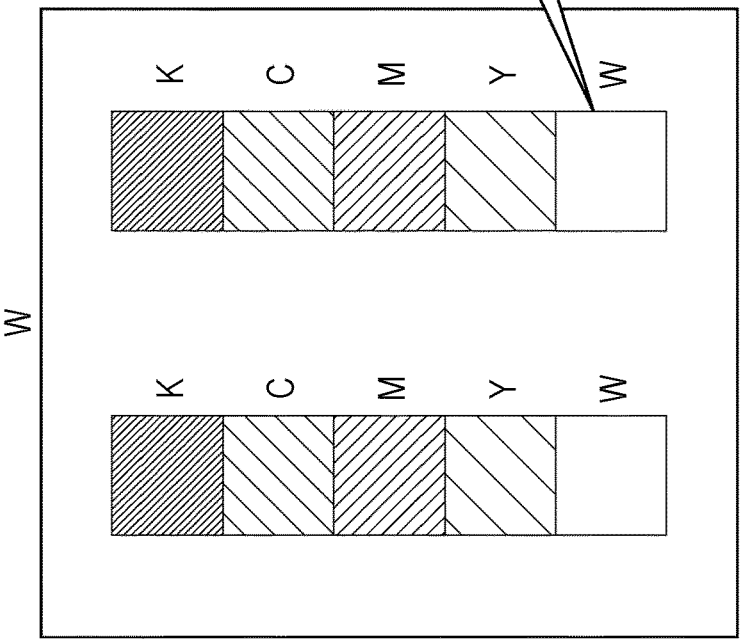

FIGS. 4A and 4B are diagrams for describing an automatic maximum density adjustment process in the color adjustment process according to the embodiment. FIGS. 4A and 4B illustrate an example of a density patch. Patches of five colors (yellow (Y), magenta (M), cyan (C), black (K), and white (W)) are printed on one specific paper with the maximum densities, and the densities of the patches are measured by the colorimeter 180 provided in the paper ejector 14 at a subsequent stage. As one of the color adjustment process, the color adjuster 20 executes the automatic maximum density adjustment process of adjusting an optimum amount of deposited toner at the maximum density on the basis of the measurement result of the colorimeter 180. This adjustment can be performed for each color (yellow (Y), magenta (M), cyan (C), black (K), and white (W)).

For example, FIG. 4A illustrates a case where patches of five colors (yellow (Y), magenta (M), cyan (C), black (K), and white (W)) are printed on white paper with the maximum densities. There is a possibility that it is difficult to measure white (W) on the white background even if the white (W) has the maximum density.

FIG. 4B illustrates a case where patches of five colors (yellow (Y), magenta (M), cyan (C), black (K), and white (W)) are printed on black paper with the maximum densities. There is a possibility that it is difficult to measure black (K) on the black background even if the black (K) has the maximum density.

Figure 5B:
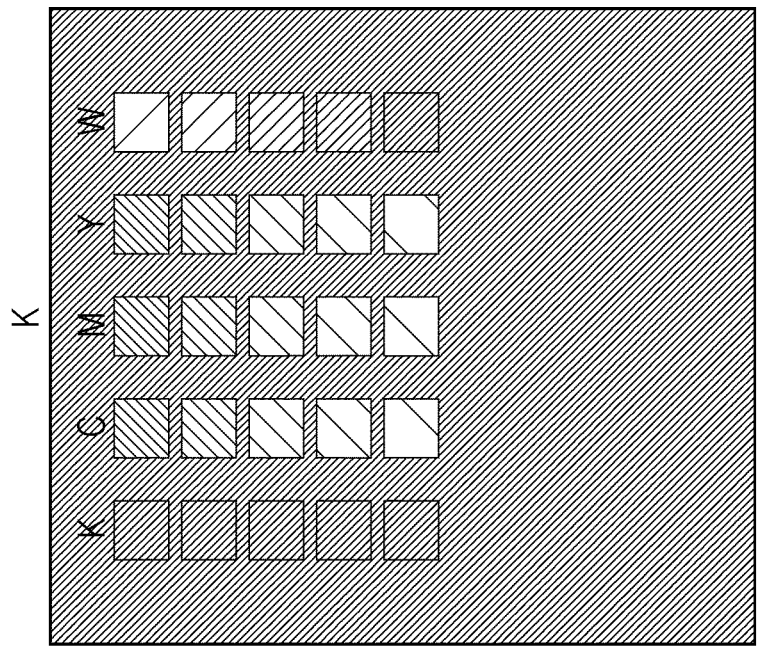
FIGS. 5A and 5B are diagrams for describing an output-paper-density adjustment process in the color adjustment process according to the embodiment.
Figure 5A:
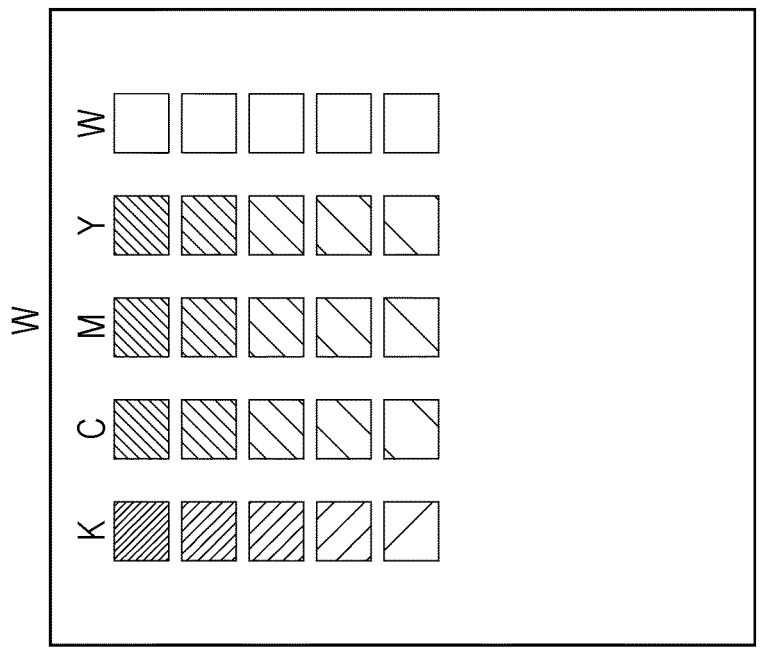

FIGS. 5A and 5B are diagrams for describing the output-paper-density adjustment process in the color adjustment process according to the embodiment. FIGS. 5A and 5B illustrate an example of a density patch. Patches of five colors (yellow (Y), magenta (M), cyan (C), black (K), and white (W)) are printed on one specific paper with gradation densities, and the densities of the patches are measured by the colorimeter 180 provided in the paper ejector 14 at a subsequent stage. As one of the color adjustment process, the color adjuster 20 executes the output-paper-density adjustment process to obtain an optimum gamma curve on the basis of the measurement result of the colorimeter 180. This adjustment can be performed for each color (yellow (Y), magenta (M), cyan (C), black (K), and white (W)).

For example, FIG. 5A illustrates a case where patches of five colors (yellow (Y), magenta (M), cyan (C), black (K), and white (W)) are printed on white paper with gradation densities. There is a possibility that it is difficult to measure the gradation density of white (W) on the white background.

FIG. 5B illustrates a case where patches of five colors (yellow (Y), magenta (M), cyan (C), black (K), and white (W)) are printed on black paper with gradation densities. There is a possibility that it is difficult to measure the gradation density of black (K) on the black background.

Figure 6A:
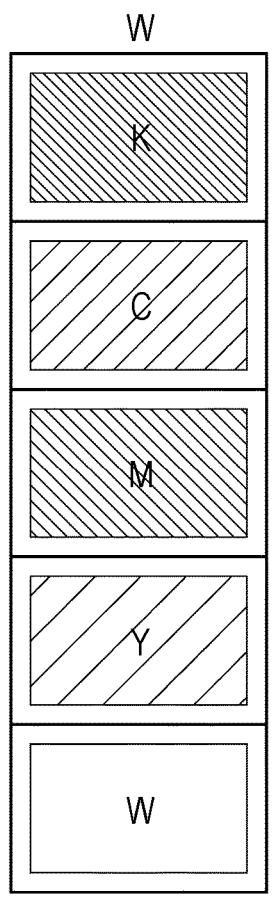
FIGS. 6A and 6B are diagrams for describing a density balance adjustment process in the color adjustment process according to the embodiment.
Figure 6B:
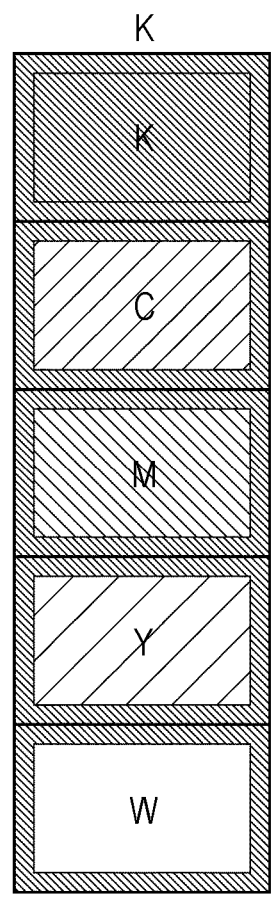

FIGS. 6A and 6B are diagrams for describing the density balance adjustment process in the color adjustment process according to the embodiment. FIGS. 6A and 6B illustrate an example of a density patch. Solid patches of five colors (yellow (Y), magenta (M), cyan (C), black (K), and white (W)) are printed with maximum densities throughout five specific papers, respectively, and the densities of the patches are measured by the colorimeter 180 provided in the paper ejector 14 at a subsequent stage. As one of the color adjustment process, the color adjuster 20 executes the density balance adjustment process of adjusting a deposited amount of toner for each print position on the basis of the measurement result of the colorimeter 180. This adjustment can be performed for each color (yellow (Y), magenta (M), cyan (C), black (K), and white (W)).

For example, FIG. 6A illustrates a case where solid patches of five colors (yellow (Y), magenta (M), cyan (C), black (K), and white (W)) are printed throughout white papers, respectively. There is a possibility that it is difficult to measure the density of white (W) on the white background.

FIG. 6B illustrates a case where solid patches of five colors (yellow (Y), magenta (M), cyan (C), black (K), and white (W)) are printed throughout black papers, respectively. There is a possibility that it is difficult to measure the density of black (K) on the black background.

FIG. 7 is a diagram for describing paper profile information according to the embodiment. Referring to FIG. 7, the paper profile information includes two types of data that are "basic setting" and "characteristic value".

The "characteristic value" of the paper profile information is registered on the basis of the value acquired by the paper measurer 190. Specifically, information such as "smoothness", "basis weight", "water content", and "thickness" of the paper is registered as the "characteristic value".

As the "basic setting" of the paper profile information, the user may register information regarding "paper name", "paper type", and "paper color" using the input unit 132 of the operation panel 13.

In the present example, five types of paper information are stored in the nonvolatile memory 167 as the paper profile information.

Specifically, in the illustrated example, paper information of "white plain paper", "black plain paper", "white glossy paper", "yellow plain paper", and "white thick paper" is registered as the "paper name".

Note that the paper information is not limited thereto, and a plurality of pieces of information may be further registered.

In addition, paper color information may be registered as the characteristic value using the paper measurer 190.

In the present example, the paper measurer 190 is provided inside the image forming apparatus 1, but the configuration is not limited thereto, and the paper measurer 190 may be provided outside the image forming apparatus 1 or may not be directly connected to the image forming apparatus 1.

Which paper is stored in each tray of the paper feeder 12 is registered. Specifically, the number of the paper profile information is registered in association with the tray.

FIG. 8 is a diagram for describing a color-adjustment paper information determination database according to the embodiment. Referring to FIG. 8, information for determining whether or not color adjustment based on a combination of a plurality of types of color adjustment processes and paper information is possible is registered.

Specifically, the color adjustment process is generally categorized into "automatic maximum density adjustment" process, "output-paper-density adjustment" process, and "automatic density balance adjustment" process.

Specifically, the "automatic maximum density adjustment" process includes an "automatic maximum density adjustment (YMCK)" process and an "automatic maximum density adjustment (W)" process.

The "output-paper-density adjustment" process includes an "output-paper-density adjustment (for white plain paper)" process, an "output-paper-density adjustment (for black plain paper)" process, an "output-paper-density adjustment (for white glossy paper)" process, and an "output-paper-density adjustment (for yellow plain paper)" process.

The "density balance adjustment" process includes a "density balance adjustment (for white plain paper)" process, a "density balance adjustment (for black plain paper)" process, a "density balance adjustment (for white glossy paper)" process, and a "density balance adjustment (for yellow plain paper)" process.

In addition, symbols "○", "Δ", and "x" are indicated as the paper information. The symbol "○" indicates an adjustment in which the corresponding color adjustment process is executable.

The symbol "Δ" indicates an adjustment in which a part of the corresponding color adjustment process is executable. The symbol "x" indicates an adjustment in which the corresponding color adjustment process is inexecutable. Note that the adjustment in which a part of the color adjustment process is executable indicates an adjustment which can be executed without any problem although the accuracy of adjustment is reduced.

The present example has described the case where the symbols "○", "Δ", and "x" are set in the color-adjustment paper information determination database, but the configuration is not particularly limited thereto, and any data may be used as long as it can identify that the corresponding adjustment is executable, partly executable, or inexecutable.

Figure 9:
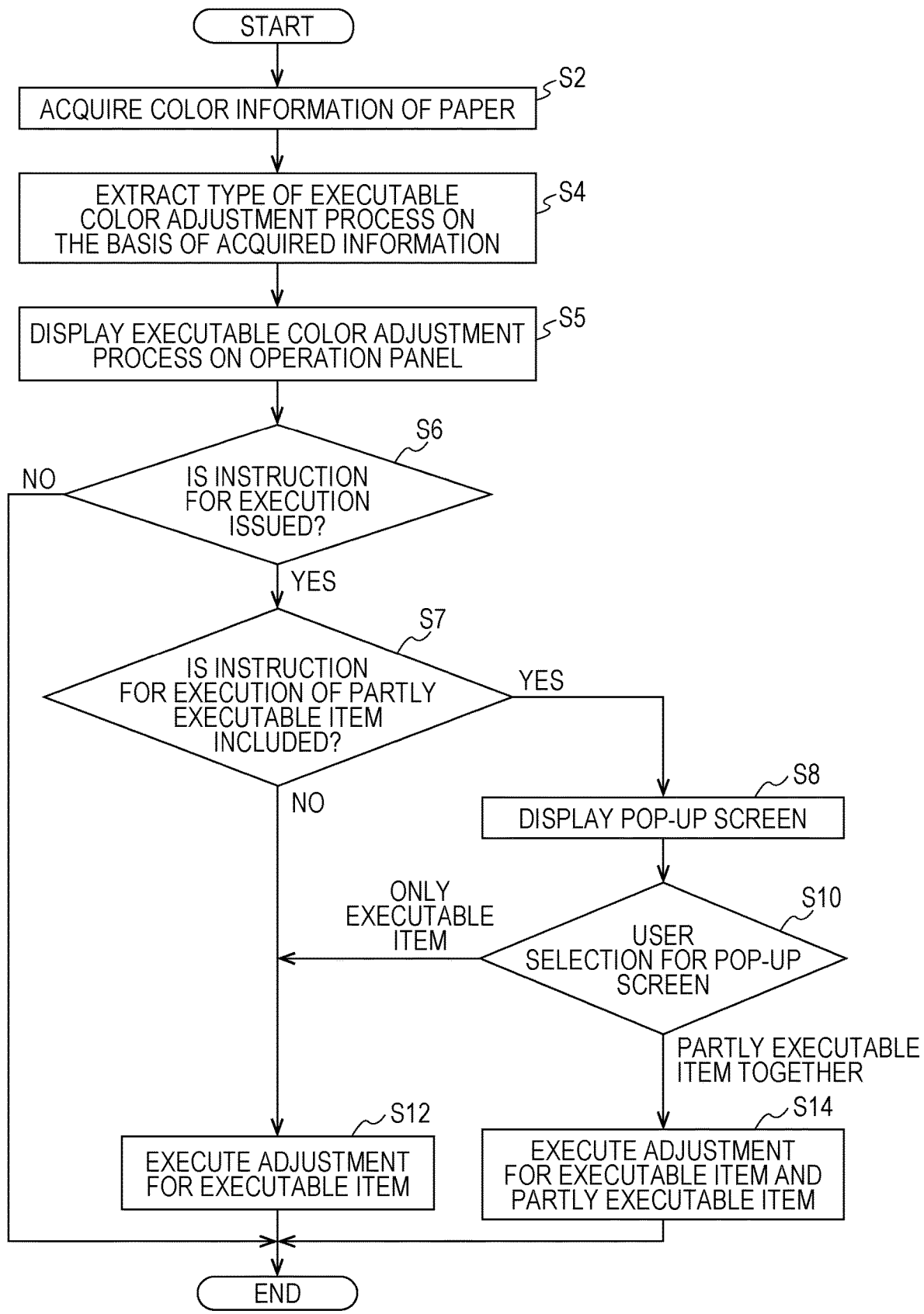
FIG. 9 is a flowchart illustrating the color adjustment process performed by the image control unit according to the embodiment.

FIG. 9 is a flowchart illustrating the color adjustment process performed by the image control unit 161 according to the embodiment. Referring to FIG. 9, the paper information acquisitor 22 acquires color information of paper (step S2). The paper information acquisitor 22 acquires color information of paper accommodated in the tray of the paper feeder 12 selected on the operation panel 13. Specifically, the number of the paper profile information is registered in association with the tray.

Next, the color adjustment possibility determiner 24 extracts types of executable color adjustment process on the basis of the acquired information (step S4). Specifically, the color adjustment possibility determiner 24 refers to the color-adjustment paper information determination database and extracts a color adjustment process that can be executed for the color of the paper.

Next, the color adjuster 20 displays, on the operation panel 13, the color adjustment process that can be executed on the basis of the extraction result of the color adjustment possibility determiner 24 (step S5).

Figure 10:
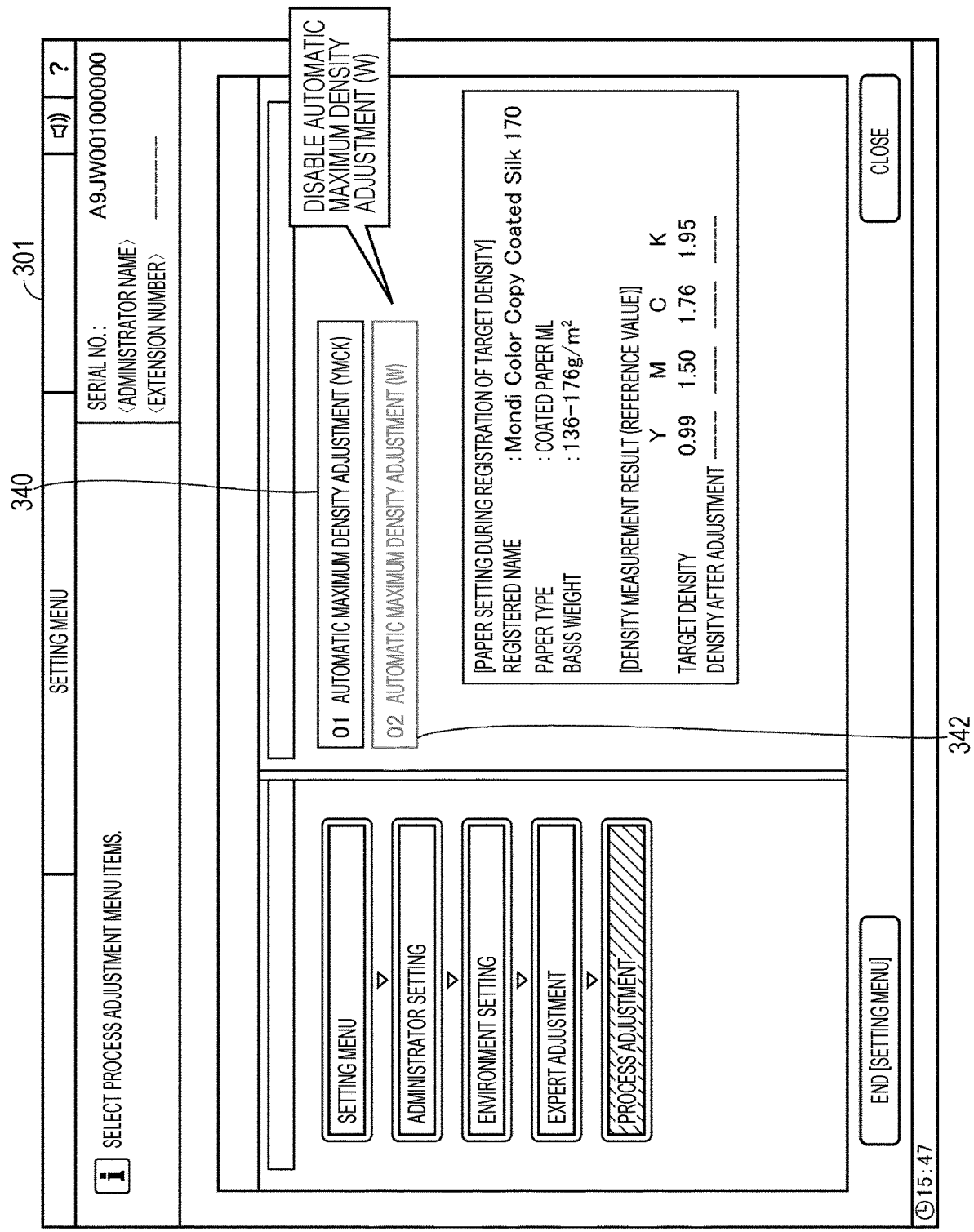
FIG. 10 is a diagram for describing a screen of an operation panel according to the embodiment.

FIG. 10 is a diagram for describing a screen 301 of the operation panel 13 according to the embodiment. Referring to FIG. 10, a menu button 340 for automatic maximum density adjustment (YMCK) and a menu button 342 for automatic maximum density adjustment (white) are provided. If the inserted paper is white, the menu button 342 for the automatic maximum density adjustment (white) is shaded, and only the automatic maximum density adjustment (YMCK) is selectable.

In the case of a combination in which the color adjustment process cannot be performed, prohibition can be displayed so that the user cannot perform the color adjustment process. Note that there are various types of display methods, and the method is not limited the abovementioned one.

FIG. 11 is a diagram for describing a screen 302 for describing automatic maximum density adjustment according to the embodiment. FIG. 11 illustrates an example in which the menu button 340 for the automatic maximum density adjustment (YMCK) is selected. Furthermore, a "print mode" button 304 for instructing execution of the color adjustment process is provided. An instruction to execute the color adjustment process is issued by selecting the "print mode" button 304.

Referring again to FIG. 9, next, the color adjuster 20 determines whether or not an instruction to execute the color adjustment process displayed on the operation panel 13 is issued (step S6).

When the color adjuster 20 determines in step S6 that the instruction to execute the color adjustment process is issued (YES in step S6), the processing proceeds to step S7.

On the other hand, when the color adjuster 20 determines in step S6 that the instruction to execute the color adjustment process is not issued (NO in step S6), the processing ends (End).

Next, the color adjuster 20 determines whether or not the color adjustment process includes execution of a partly executable adjustment process (step S7).

When determining in step S7 that the color adjustment process includes execution of a partly executable adjustment process (YES in step S7), the color adjuster 20 displays a pop-up screen (step S8).

Figure 12:
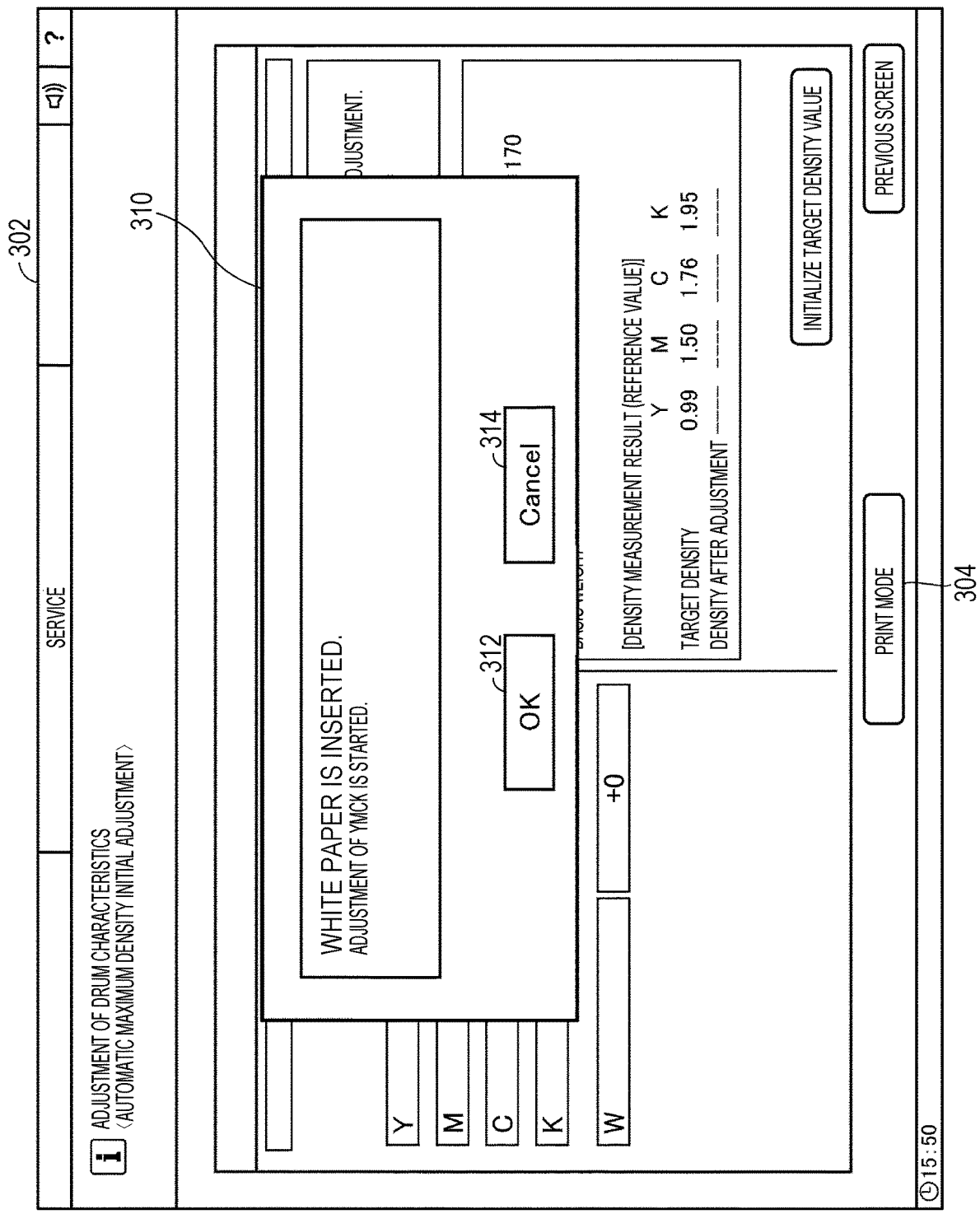
FIG. 12 is a diagram for describing a pop-up screen (part 1) when the automatic maximum density adjustment according to the embodiment is executed.

FIG. 12 is a diagram for describing a pop-up screen 310 (part 1) when the automatic maximum density adjustment according to the embodiment is executed. Referring to FIG. 12, here, when the "automatic maximum density adjustment" is started in a case where "white plain paper" is inserted, a screen for indicating execution of the adjustment of "YMCK" is displayed.

When an "OK" button 312 is selected, execution of color adjustment of "YMCK" is started.

In this case, the adjustment of "W" is not executed.

When a "cancel" button 314 is selected, the color adjustment process is canceled.

Figure 13:
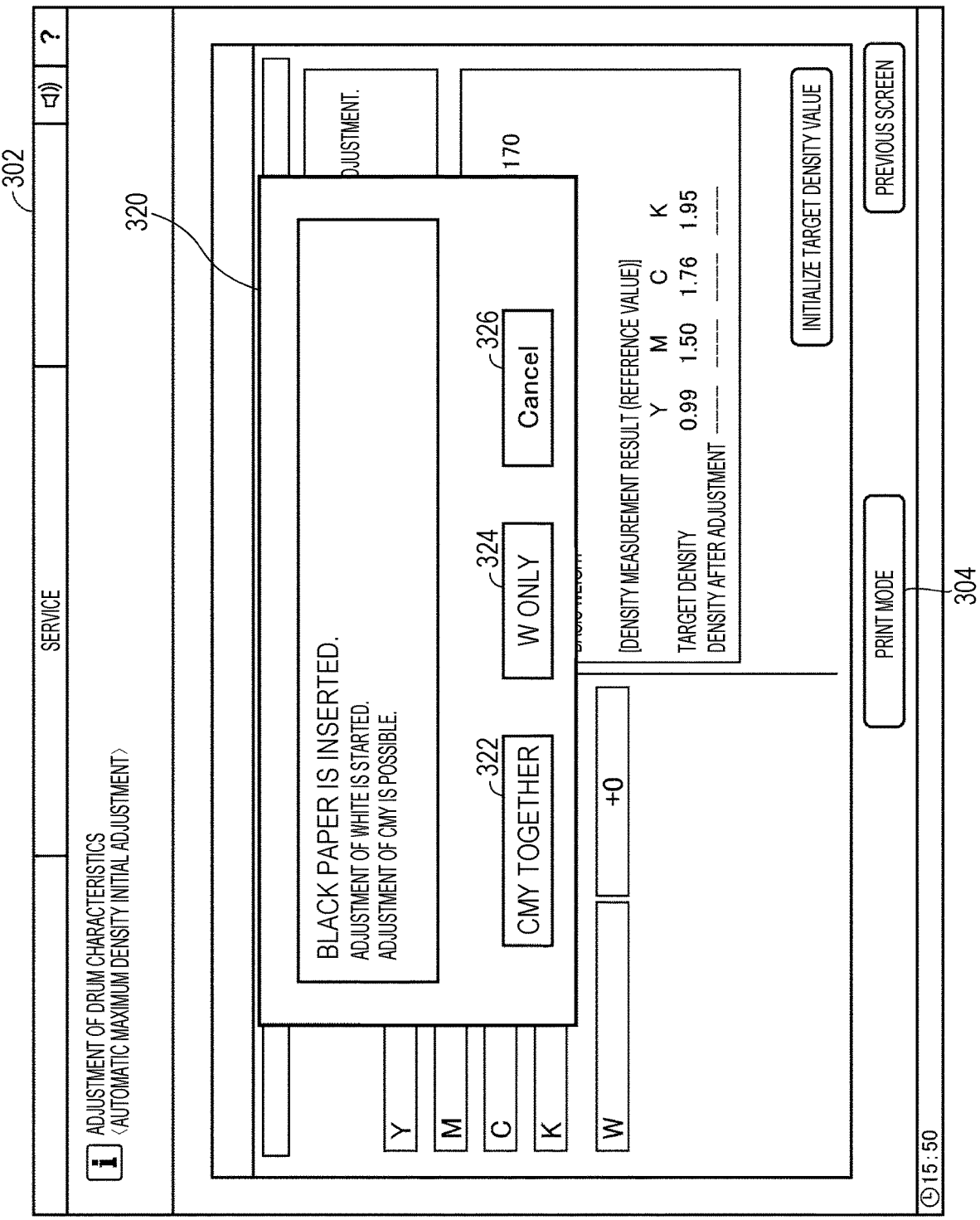
FIG. 13 is a diagram for describing a pop-up screen (part 2) when the automatic maximum density adjustment according to the embodiment is executed.

FIG. 13 is a diagram for describing a pop-up screen 320 (part 2) when the automatic maximum density adjustment according to the embodiment is executed. Referring to FIG. 13, here, when the "automatic maximum density adjustment" is started in a case where "black plain paper" is inserted, a screen for prompting the user to select which adjustment is performed.

Specifically, a "W only" button 324 related to adjustment of only white, a "CMY together" button 322 related to the adjustment of CMY because the adjustment of CMY is possible although not optimal, and a "cancel" button 326 are provided.

When the "CMY together" button 322 is selected, execution of color adjustment of "CMY" is started together with adjustment of "W".

When the "W only" button 324 is selected, execution of color adjustment of "W" is started. When the "cancel" button 324 is selected, the color adjustment process is canceled.

Referring again to FIG. 9, in step S10, the color adjuster 20 determines, as the user selection on the pop-up screen, whether the user selects color adjustment including only an executable item or color adjustment also including a partly executable item.

When determining in step S10 that the user selects the color adjustment including only the executable item (only executable item in step S10), the color adjuster 20 executes adjustment for the executable item (step S12). Specifically, when determining that, for example, the "W only" button 324 related to adjustment of only white is selected on the pop-up screen 320, the color adjuster 20 executes the color adjustment of "W".

Then, the adjustment process ends.

When determining in step S10 that the user selects the color adjustment also including the partly executable item (partly executable item together in step S10), the color adjuster 20 executes adjustment for the executable item and the partly executable item (step S14). Specifically, when determining that, for example, the "CMY together" button 322 is selected on the pop-up screen 320, the color adjuster 20 executes the color adjustment of "CMY" together with the color adjustment of "W". Then, the adjustment process ends (End).

When determining in step S7 that there is no partly executable item (NO in step S7), the color adjuster 20 executes adjustment for the executable item (step S12). Specifically, the color adjuster 20 executes normal color adjustment for the executable item. Then, the adjustment process ends.

Due to the process described above, the possibility of the color adjustment can be determined by a simple method. Then, it is possible to extract the color adjustment that can be executed and appropriately execute the color adjustment. In addition, it is possible to display a pop-up screen so that the user can confirm whether to execute the color adjustment, which is also convenient for the user. In addition, it is possible to avoid troublesome operation such as paper replacement due to adjustment failure and to prevent waste paper.

Note that the present example has described the configuration in which, when it is determined that there is a partly executable item, the pop-up screen is displayed to prompt the user to make selection. However, the configuration is not limited to thereto, and the color adjustment process may be executed for an item for which the adjustment process can be performed without displaying the pop-up screen.

(Modification)

FIG. 14 is a diagram for describing a color-adjustment paper information determination database according to a modification of the embodiment. The color-adjustment paper information determination database in FIG. 14 is different from the color-adjustment paper information determination database in FIG. 8 in having a correlation field. The other configurations are similar, and thus, the detailed description thereof will not be repeated.

Specifically, the automatic maximum density adjustment (white) is set in association with the automatic maximum density adjustment (YMCK). In addition, the automatic maximum density adjustment (YMCK) is set in association with the automatic maximum density adjustment (white).

FIG. 15 is a diagram for describing an execution history database according to the modification of the embodiment. Referring to FIG. 15, in the execution history database, a plurality of color adjustment functions and a previous execution date are set in association with each other.

In the modification according to the embodiment, in a case where, during execution of color adjustment, a predetermined condition is satisfied regarding a color adjustment correlated with the color adjustment, a pop-up screen prompting the user to determine whether to execute the color adjustment is displayed.

Figure 16:
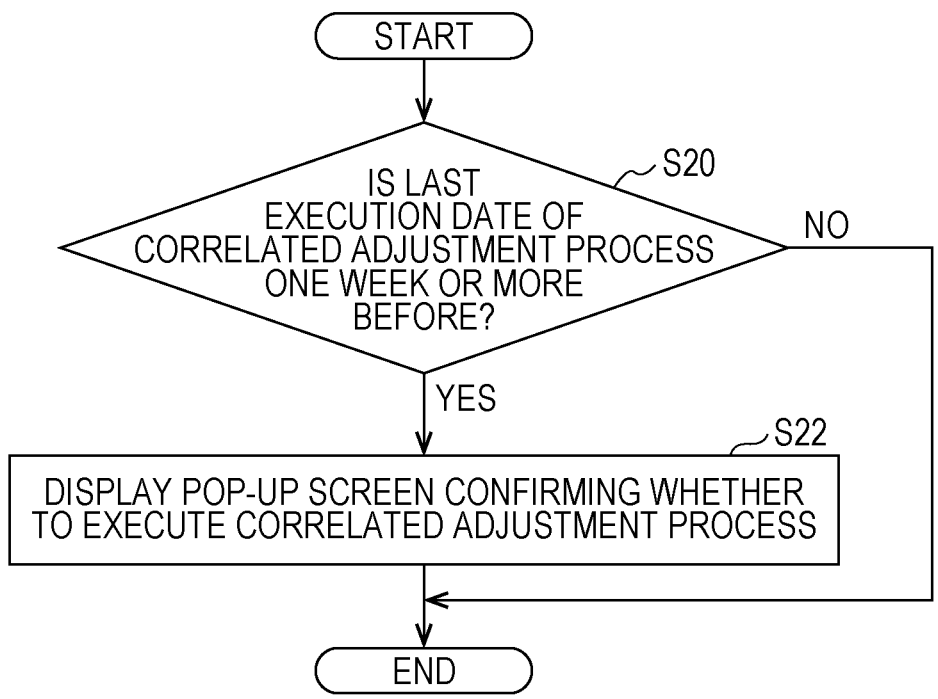
FIG. 16 is a flowchart illustrating processing performed by a guidance presenter according to the modification of the embodiment.

FIG. 16 is a flowchart illustrating a process performed by a guidance presenter 26 according to the modification of the embodiment. Referring to FIG. 16, the guidance presenter 26 refers to the execution history database and determines whether or not the last execution date of the correlated adjustment process is one week before (step S20).

In step S20, when the guidance presenter 26 refers to the execution history database and determines that the last execution date of the correlated adjustment process is one week before (YES in step S20), a pop-up screen for confirming whether to execute the correlated adjustment process is displayed (step S22). Then, the process ends (End).

On the other hand, when the guidance presenter 26 determines in step S20 that the last execution date of the correlated adjustment process is not one week before by referring to the execution history database (NO in step S20), the process ends without displaying the pop-up screen (End).

In a case where execution of the adjustment process is instructed on the pop-up screen, the color adjuster 20 executes the corresponding adjustment process on the basis of the flow described in FIG. 9.

Figure 17:
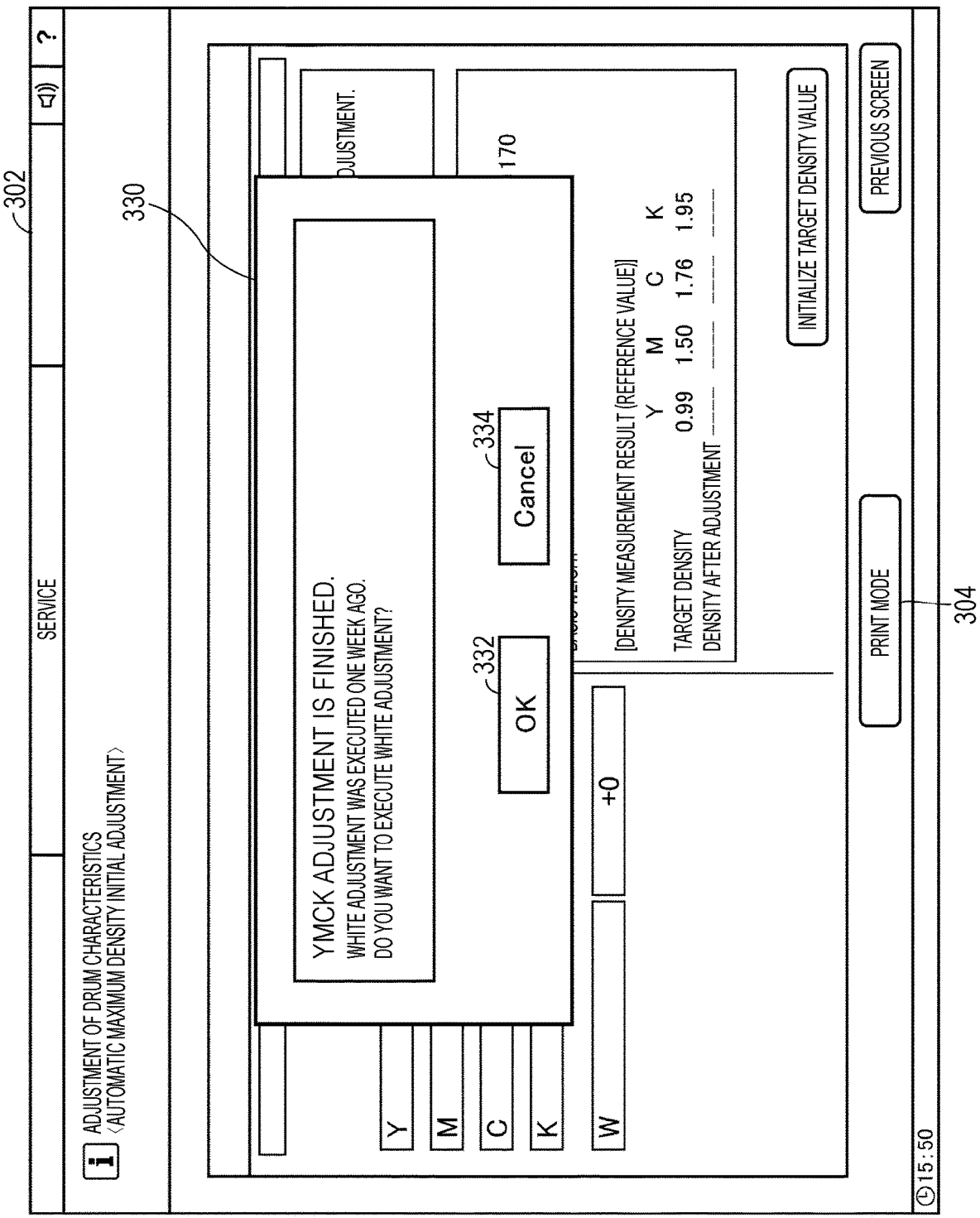
FIG. 17 is a diagram illustrating an example of a pop-up screen according to the modification of the embodiment.

FIG. 17 is a diagram illustrating an example of a pop-up screen 330 according to the modification of the embodiment. Referring to FIG. 17, a confirmation screen is displayed that includes a message "YMCK adjustment is finished." together with a message such as "White adjustment was executed one week ago. Do you want to execute white adjustment?".

When an "OK" button 332 is selected, execution of color adjustment of "W" is started.

When a "cancel" button 334 is selected, the adjustment of "W" is not executed.

It is possible to continuously execute the correlated adjustment process by displaying, after the automatic maximum density adjustment (YMCK) has been completed, a pop-up screen for confirming whether to transfer to the automatic maximum density adjustment (white) in a case where the last execution date of the automatic maximum density adjustment (white) is prior to a given period.

As a result, it is possible to periodically perform necessary color adjustment process, which makes it easy to maintain high quality.

In the color-adjustment paper information determination database illustrated in FIG. 14, correlation is established only for the automatic maximum density adjustment, but the configuration is not limited thereto, and the correlation can be similarly registered for other color adjustment.

Furthermore, although the present example has the case where the guidance presenter 26 displays the pop-up screen for confirming whether to perform the correlated adjustment process with reference to the color-adjustment paper information determination database, another method may be adopted.

For example, when determining that the last execution date of certain color adjustment process is prior to a predetermined period by referring to the execution history database, the guidance presenter 26 may display a pop-up screen prompting execution of the color adjustment process. In this case, it is also possible to periodically perform necessary color adjustment process, which makes it easy to maintain high quality.

<Supplementary Matter>

The above-described embodiment includes the following technical ideas.

<Supplementary Matter 1>

An image forming apparatus comprising:
a printer (150) that performs printing on paper;
a color adjuster (20) that is able to execute a color adjustment process of a color to be printed on the paper by the printer on the basis of a result of printing on the paper;
a paper information acquisitor (22) that acquires paper information of the paper to pass through the printer; and
a color adjustment possibility determiner (24) that determines whether or not the color adjustment process by the color adjuster is possible on the basis of a result of acquisition of the paper information by the paper information acquisitor.

<Supplementary Matter 2>

The image forming apparatus described in Supplementary matter 1, wherein the color adjustment possibility determiner includes a color-adjustment paper information determination database that is used for determining whether or not the color adjustment process by the color adjuster is possible in accordance with the paper information.

<Supplementary Matter 3>

The image forming apparatus described in Supplementary matter 2, wherein the color-adjustment paper information determination database includes information requiring white paper corresponding to a black color adjustment process.

<Supplementary Matter 4>

The image forming apparatus described in any one of Supplementary matters 1 to 3, wherein the color adjuster executes a color adjustment process determined to be executable by the color adjustment possibility determiner on the paper.

<Supplementary Matter 5>

The image forming apparatus described in any one of Supplementary matters 1 to 4, further comprising
a history storage (167) that stores execution history information of the color adjustment process by the color adjuster, and
a guidance presenter (26) that prompts execution of the color adjustment process by the color adjuster on the basis of the execution history information stored in the history storage.

<Supplementary Matter 6>

The image forming apparatus described in Supplementary matter 4, wherein the guidance presenter prompts execution of another color adjustment process correlated with a color adjustment process that has been executed among a plurality of color adjustment processes on the basis of the execution history information stored in the history storage.

<Supplementary Matter 7>

The image forming apparatus described in any one of Supplementary matters 1 to 6, further comprising an operation panel (13) that receives an operation of executing a plurality of selectable color adjustment processes from a user, wherein
the color adjuster displays prohibition of an item for which the color adjustment process is inexecutable among items of the plurality of color adjustment processes displayed on the operation panel on the basis of a determination result of the color adjustment possibility determiner.

<Supplementary Matter 8>

The image forming apparatus described in any one of Supplementary matters 1 to 7, wherein the paper information acquisitor acquires a measurement result by a paper measurer that measures characteristics of paper as the paper information of the paper.

<Supplementary Matter 9>

The image forming apparatus described in any one of Supplementary matters 1 to 8, further comprising an operation panel (13) capable of receiving an input from a user, wherein the paper information acquisitor acquires the paper information in accordance with information input via the operation panel.

<Supplementary Matter 10>

The image forming apparatus described in any one of Supplementary matters 1 to 9, further comprising: an operation panel (13) that receives an operation of executing a plurality of selectable color adjustment processes from a user, wherein
the color adjuster displays a confirmation screen for confirming execution of a part of color adjustment of the color adjustment process on the basis of a determination result by the color adjustment possibility determiner on the operation panel.

<Supplementary Matter 11>

A method for controlling an image forming apparatus, the method comprising:
performing printing on paper; and
executing a color adjustment process of a color to be printed on the paper on the basis of a result of printing on the paper,
wherein the executing the color adjustment process includes
acquiring paper information of the paper to pass through the printer (S2), and
determining whether or not the color adjustment process is possible on the basis of a result of acquisition of the paper information (S4).

<Supplementary Matter 12>

A non-transitory recording medium storing a computer readable program for controlling an image forming apparatus, the program causing a computer to execute:
performing printing on paper; and
executing a color adjustment process of a color to be printed on the paper on the basis of a result of printing on the paper,
wherein the executing the color adjustment process includes
acquiring paper information of the paper to pass through the printer (S2), and
determining whether or not the color adjustment process is possible on the basis of a result of acquisition of the paper information (S4).

Although embodiments of the present invention have been described and illustrated in detail, the disclosed embodiments are made for purposes of illustration and example only and not limitation. The scope of the present invention should be interpreted by terms of the appended claims, rather than the description above, and is intended to include any modifications within the scope of the claims and their equivalents.

What is claimed is:

1. An image forming apparatus comprising:
a printer that performs printing on paper;
a first hardware processor that is able to execute a color adjustment process of a color to be printed on the paper by the printer on the basis of a result of printing on the paper;
a second hardware processor that acquires paper information of the paper to pass through the printer;
a third hardware processor that determines whether or not the color adjustment process by the first hardware processor is possible on the basis of a result of acquisition of the paper information by the second hardware processor;
a correlation database that stores correlation information of the color adjustment process, the correlation information indicating that the color adjustment process is correlated with another color adjustment process;
a history storage that stores execution history information indicating a previous execution date on which the another color adjustment process is previously executed by the first hardware processor; and
a fourth hardware processor that
determines, when the color adjustment process is executed, the another color adjustment process based on the color adjustment process by using the correlation information,
determines the previous execution date of the another color adjustment process by using the history storage,
determines the previous execution date of the another color adjustment process satisfies a predetermined condition,
displays a pop-up screen for confirming whether to execute the another color adjustment process on a display when the previous execution date of the another color adjustment process satisfies the predetermined condition.

2. The image forming apparatus according to claim 1, wherein the third hardware processor includes a color-adjustment paper information determination database that is used for determining whether or not the color adjustment process by the first hardware processor is possible in accordance with the paper information.

3. The image forming apparatus according to claim 2, wherein the color-adjustment paper information determination database includes information requiring white paper corresponding to a black color adjustment process.

4. The image forming apparatus according to claim 1, wherein the first hardware processor executes a color adjustment process determined to be executable by the third hardware processor on the paper.

5. The image forming apparatus according to claim 1, further comprising an operation panel that receives an operation of executing a plurality of selectable color adjustment processes from a user, wherein
the first hardware processor displays prohibition of an item for which the color adjustment process is inexecutable among items of the plurality of color adjustment processes displayed on the operation panel on the basis of a determination result of the third hardware processor.

6. The image forming apparatus according to claim 1, wherein the second hardware processor acquires a measurement result by a paper measurer that measures characteristics of paper as the paper information of the paper.

7. The image forming apparatus according to claim 1, further comprising an operation panel capable of receiving an input from a user, wherein
the second hardware processor acquires the paper information in accordance with information input via the operation panel.

8. The image forming apparatus according to claim 1, further comprising an operation panel that receives an operation of executing a plurality of selectable color adjustment processes from a user, wherein
the first hardware processor displays a confirmation screen for confirming execution of a part of color adjustment of the color adjustment process on the basis of a determination result by the third hardware processor on the operation panel.

9. A method for controlling an image forming apparatus, the method comprising:
performing printing on paper;
executing a color adjustment process of a color to be printed on the paper on the basis of a result of printing on the paper;
providing a correlation database that stores correlation information of the color adjustment process, the correlation information indicating that the color adjustment process is correlated with another color adjustment process; and
providing a history storage that stores execution history information indicating a previous execution date on which the another color adjustment process is previously executed by the first hardware processor,
wherein the executing the color adjustment process includes
acquiring paper information of the paper to pass through the printer,
determining whether or not the color adjustment process is possible on the basis of a result of acquisition of the paper information,
determining, when the color adjustment process is executed, the another color adjustment process based on the color adjustment process by using the correlation information,
determining the previous execution date of the another color adjustment process by using the history storage,
determining the previous execution date of the another color adjustment process satisfies a predetermined condition,
displaying a pop-up screen for confirming whether to execute the another color adjustment process on a display when the previous execution date of the another color adjustment process satisfies the predetermined condition.

10. A non-transitory recording medium storing a computer readable program for controlling an image forming apparatus, the program causing a computer to execute:
performing printing on paper;
executing a color adjustment process of a color to be printed on the paper on the basis of a result of printing on the paper;
providing a correlation database that stores correlation information of the color adjustment process, the correlation information indicating that the color adjustment process is correlated with another color adjustment process; and providing a history storage that stores execution history information indicating a previous execution date on which the another color adjustment process is previously executed by the first hardware processor, wherein the executing the color adjustment process includes acquiring paper information of the paper to pass through the printer, determining whether or not the color adjustment process is possible on the basis of a result of acquisition of the paper information, providing a correlation database that stores correlation information of the color adjustment process, the correlation information indicating that another color adjustment process is correlated with the color adjustment process; and providing a history storage that stores execution history information of the color adjustment process, the execution history information indicating a previous execution date on which the another color adjustment process is previously executed by the first hardware processor.

* * * * *